(12) United States Patent
Takahashi et al.

(10) Patent No.: US 11,055,500 B2
(45) Date of Patent: Jul. 6, 2021

(54) CARD READER

(71) Applicant: NIDEC SANKYO CORPORATION, Nagano (JP)

(72) Inventors: Kazunori Takahashi, Nagano (JP); Kazutoshi Ishikawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/642,380

(22) PCT Filed: Aug. 2, 2018

(86) PCT No.: PCT/JP2018/029083
§ 371 (c)(1),
(2) Date: Feb. 27, 2020

(87) PCT Pub. No.: WO2019/044370
PCT Pub. Date: Mar. 7, 2019

(65) Prior Publication Data
US 2020/0349327 A1   Nov. 5, 2020

(30) Foreign Application Priority Data

Aug. 31, 2017   (JP) ............................ JP2017-166586

(51) Int. Cl.
*G06K 7/08*   (2006.01)

(52) U.S. Cl.
CPC .................................. *G06K 7/087* (2013.01)

(58) Field of Classification Search
CPC .......... G06K 7/087; G06K 7/08; G06K 13/06; G07D 7/004; G07D 9/00; G11B 5/008; G11B 5/02; G11B 33/10
See application file for complete search history.

(56) References Cited

U.S. PATENT DOCUMENTS

| 2007/0040023 A1 | 2/2007 | Ruggirello et al. |
| 2007/0080225 A1* | 4/2007 | Hirasawa ........... G06K 13/0893 235/449 |

(Continued)

FOREIGN PATENT DOCUMENTS

| CN | 101551926 | 10/2009 |
| CN | 204143543 | 2/2015 |

(Continued)

OTHER PUBLICATIONS

"International Search Report (Form PCT/ISA/210) of PCT/JP2018/029083," dated Sep. 18, 2018, with English translation thereof, pp. 1-4.

(Continued)

*Primary Examiner* — Matthew Mikels
(74) *Attorney, Agent, or Firm* — JCIPRNET

(57) ABSTRACT

A card reader is provided which is capable of detecting a skimming magnetic head attached to a front side of a card insertion member formed with a card insertion port and a skimming magnetic head attached to an inclined face of the card insertion port with a simple structure. The card reader includes a card insertion member 8 formed with a card insertion port 3 and a light emitting element 9 and a light receiving element for detecting that a foreign matter has been attached to the card insertion member 8. A lower face of the card insertion port 3 is formed to be an inclined face 3a which is inclined toward a lower side as going to the front side.

9 Claims, 3 Drawing Sheets

(56) References Cited

U.S. PATENT DOCUMENTS

2013/0146662 A1    6/2013   Randolph
2013/0299582 A1   11/2013   Ozawa et al.

FOREIGN PATENT DOCUMENTS

| EP | 1847971    | 10/2007 |
|----|------------|---------|
| JP | 2007265189 | 10/2007 |
| JP | 2013037555 | 2/2013  |
| JP | 2015045934 | 3/2015  |
| WO | 2013030876 | 3/2013  |

OTHER PUBLICATIONS

"Office Action of China Counterpart Application", dated Oct. 28, 2020, with English translation thereof, pp. 1-9.

\* cited by examiner

CARD READER

CROSS-REFERENCE TO RELATED APPLICATION

This application is a 371 application of the International PCT application serial no. PCT/JP2018/029083, filed on Aug. 2, 2018, which claims the priority benefit of Japan Patent Application No. 2017-166586, filed on Aug. 31, 2017. The entirety of each of the above-mentioned patent applications is hereby incorporated by reference herein and made a part of this specification.

TECHNICAL FIELD

The present invention relates to a card reader structured to perform reading of magnetic data recorded in a card and/or recording of magnetic data to a card.

BACKGROUND ART

Conventionally, a card reader has been known which is capable of preventing so-called skimming, that is, a criminal attaches a magnetic head to a card insertion part of a card reader and illegally acquires magnetic data of a card (for example, see Patent Literature 1). A card reader described in Patent Literature 1 includes a photo reflector for detecting that a magnetic head for skimming (hereinafter, referred to as a "skimming magnetic head") has been attached on a front side of a card insertion part (front panel). In the card reader, when attachment of a skimming magnetic head on a front side of the card insertion part is detected by a photo reflector, a predetermined processing is executed and thereby skimming is capable of being prevented.

In the card reader described in Patent Literature 1, a magnetic head is disposed so as to contact with an under face of a card which is inserted into the card reader. Further, in the card reader, in order to easily insert a card into a card insertion port, a lower face of the card insertion port is formed to be an inclined face in a flat face shape which is inclined to a lower side as going toward a front side, and an upper face of the card insertion port is formed to be an inclined face in a flat face shape which is inclined toward an upper side as going to the front side.

CITATION LIST

Patent Literature

[PTL 1] Japanese Patent Laid-Open No. 2007-265189

SUMMARY OF THE INVENTION

Problems to be Solved by the Invention

Skimming by a criminal has been crafted year by year, and a situation has occurred that a small skimming magnetic head is attached to the lower face (inclined face) of the card insertion port where a skimming magnetic head has not been conventionally attached. In the card reader described in Patent Literature 1, a skimming magnetic head attached on the front side of the card insertion part can be detected by a photo reflector. However, in the card reader described in Patent Literature 1, a situation that a skimming magnetic head is attached to the inclined face of the card insertion port is not anticipated and it is difficult to detect a skimming magnetic head attached to the inclined face of the card insertion port.

In view of the problem described above, the present invention provides a card reader which is capable of detecting a skimming magnetic head attached on a front side of a card insertion member formed with a card insertion port and a skimming magnetic head attached to an inclined face of the card insertion port with a simple structure.

Means to Solve the Problems

To solve the above-mentioned problem, the present invention provides a card reader including a magnetic head which performs at least one of reading of magnetic data recorded in a card and recording of magnetic data to the card, a card insertion member which is formed with a card insertion port into which the card is inserted, and a light emitting element and a light receiving element structured to detect that a foreign matter has been attached to the card insertion member. When a side in an inserting direction of the card to the card insertion port is defined as a rear side, a side in an ejecting direction of the card from the card insertion port is defined as a front side, one side in a thickness direction of the card inserted into the card insertion port is defined as a first direction side, an opposite side to the first direction side is defined as a second direction side, and an inserting and ejecting direction of the card into and from the card insertion port is defined as a front and rear direction, the magnetic head is disposed so as to contact with the card from the first direction side, a face on the first direction side of the card insertion port is formed to be an inclined face in a protruding curved face shape or in a flat face shape which is inclined toward the first direction side as going to the front side, and light emitted from the light emitting element is passed through a part of the card insertion member and then, the light is incident on the inclined face from the rear side and the first direction side and is refracted at the inclined face and is emitted from the inclined face toward at least the front side, and light emitted from the light emitting element and reflected on the front side and the second direction side of the inclined face, and light emitted from the light emitting element and reflected on the front side of the card insertion member are incident on the light receiving element.

The card reader in the present invention includes a light emitting element and a light receiving element structured to detect that a foreign matter has been attached to the card insertion member, and light emitted from the light emitting element is incident on the inclined face, which is a face on the first direction side of the card insertion port, from the rear side and the first direction side and is refracted at the inclined face and is emitted from the inclined face toward at least the front side. Further, in the present invention, light emitted from the light emitting element and reflected on the front side and the second direction side of the inclined face, and light emitted from the light emitting element and reflected on the front side of the card insertion member are incident on the light receiving element.

Therefore, according to the present invention, in both of a case that a skimming magnetic head has been attached on a front side of the card insertion member, and a case that a skimming magnetic head has been attached to the inclined face of the card insertion port, the skimming magnetic head can be detected by using a common light emitting element and a common light receiving element. Accordingly, in the present invention, a skimming magnetic head attached on a front side of the card insertion member and a skimming magnetic head attached to the inclined face of the card insertion port can be detected with a simple structure.

In the present invention, it is preferable that, in a case that a direction perpendicular to the front and rear direction and the thickness direction of the card is defined as a width direction of the card, when viewed in the width direction of the card, an optical axis of light emitted from the inclined face is inclined toward the second direction side as going to the front side, and an inclination angle of an optical axis of the light emitted from the inclined face with respect to the front and rear direction is smaller than an inclination angle with respect to the front and rear direction of an optical axis of light which is incident on the inclined face. According to this structure, an irradiation range in the front and rear direction of the light emitted from the inclined face is easily widened. Therefore, a detection region in the front and rear direction of a skimming magnetic head attached on the front side of the card insertion member can be widened and, as a result, the skimming magnetic head attached on the front side of the card insertion member is easily detected.

In the present invention, it is preferable that the card reader is formed with a card moving path which is connected with a rear end of the card insertion port and in which the card inserted into the card insertion port is moved and, when viewed in the width direction of the card, the optical axis of the light emitted from the inclined face is located on the first direction side with respect to a virtual line in a straight line shape which is extended to the front side from a face on the first direction side of the card moving path in a range of at least 10 cm from a front end of the card insertion port toward the front side. According to examination of the present inventors, when structured as described above, light emitted from the inclined face can be irradiated to an assumed attaching range of a skimming magnetic head (range in which a skimming magnetic head is assumed to be attached) which is attached on a front side of the card insertion member. Therefore, a skimming magnetic head having been attached on a front side of the card insertion member is further easily detected.

In the present invention, the light emitting element and the light receiving element are disposed on the first direction side with respect to the card moving path. Further, in the present invention, the inclined face is, for example, formed in a flat face shape.

In the present invention, it is preferable that the light emitting element emits infrared light, and the card insertion member transmits the infrared light and blocks visible light. According to this structure, visible light can be prevented from being incident on the light receiving element from the outside of the card insertion member and thus, erroneous detection of the light receiving element can be prevented. Therefore, a skimming magnetic head attached on a front side of the card insertion member and a skimming magnetic head attached to the inclined face of the card insertion port can be detected with a high degree of accuracy.

In the present invention, it is preferable that, when viewed in the front and rear direction, the light receiving element is disposed at the same position as the magnetic head in the width direction of the card. A skimming magnetic head is commonly disposed at the same position as the magnetic head in a width direction of a card and thus, according to this structure, the skimming magnetic head is easily detected.

In the present invention, it is preferable that the card insertion member is formed with an incidence surface on which the light emitted from the light emitting element is incident, and the light emitted from the light emitting element and transmitted through the incidence surface is incident on the inclined face. According to this structure, a shape of the card insertion member can be simplified. Further, in the present invention, it may be structured that the card insertion member is formed with an incidence surface on which the light emitted from the light emitting element is incident and a reflection surface reflecting the light toward the inclined face, and the light emitted from the light emitting element and transmitted through the incidence surface is reflected by the reflection surface and then is incident on the inclined face.

Effects of the Invention

As described above, according to the card reader in the present invention, a skimming magnetic head attached on the front side of the card insertion member which is formed with the card insertion port, and a skimming magnetic head attached to the inclined face of the card insertion port can be detected with a simple structure.

DESCRIPTION OF EMBODIMENTS

An embodiment of the present invention will be described below with reference to the accompanying drawings.
(Schematic Structure of Card Reader)

Figure 1:
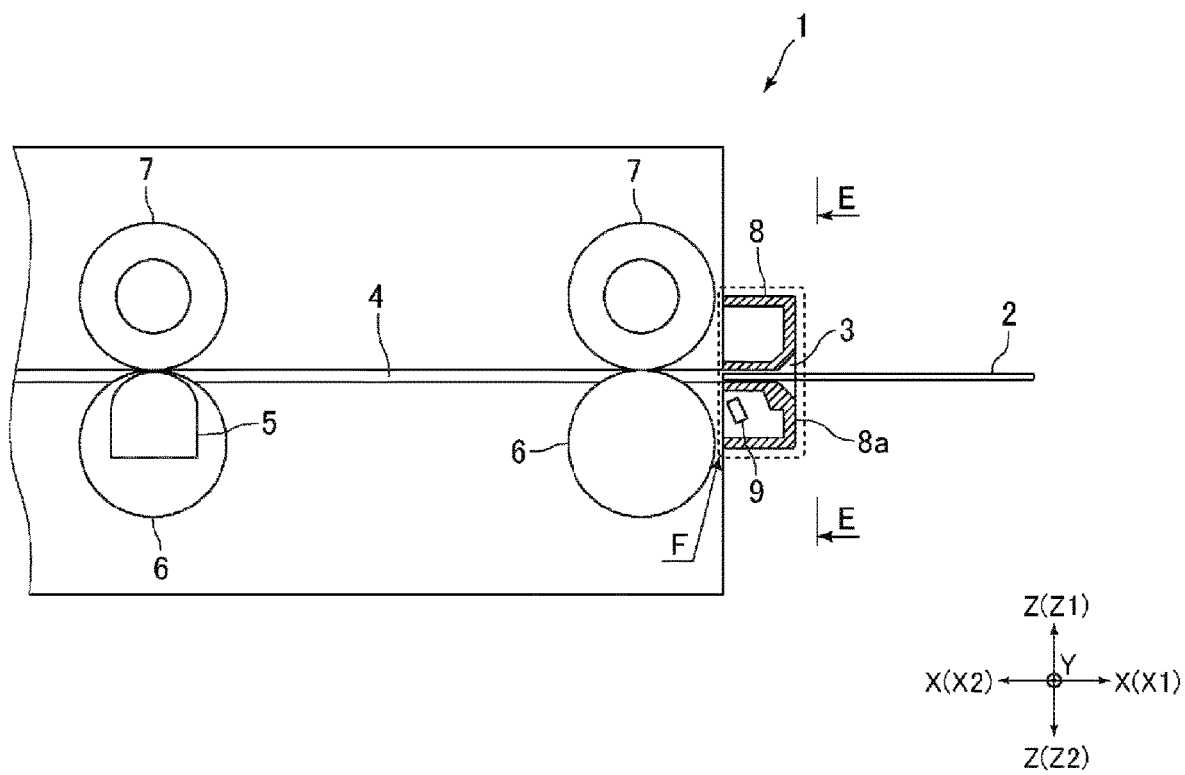
FIG. 1 is a schematic view showing a card reader in accordance with an embodiment of the present invention.
Figure 2:
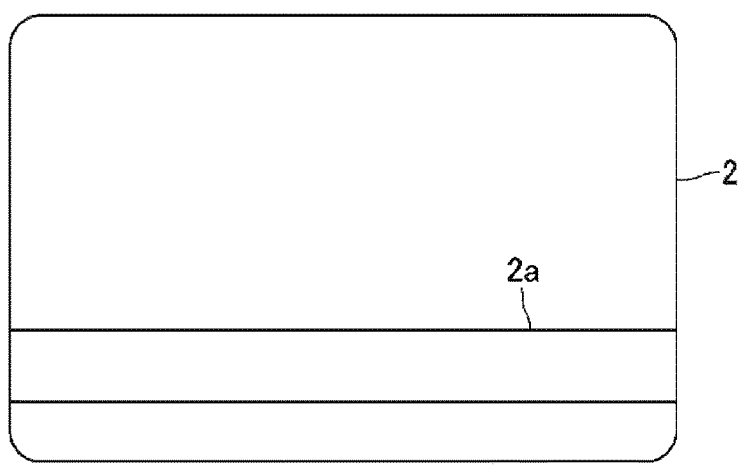
FIG. 2 is a view showing a rear face of a card shown in FIG. 1.
Figure 3:
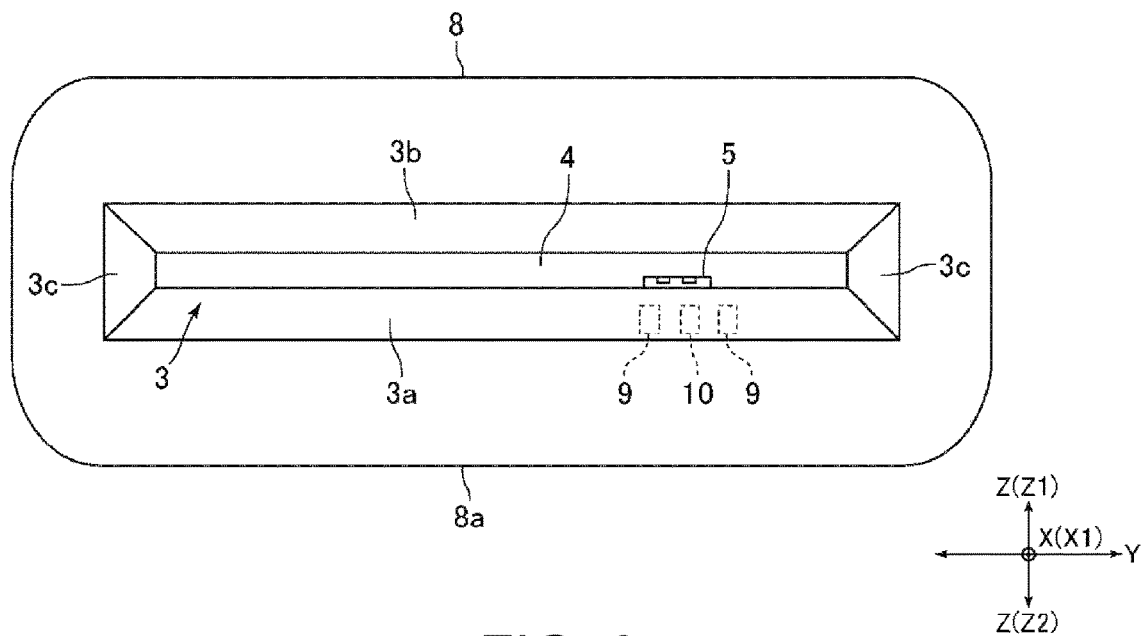
FIG. 3 is a view showing a card insertion member, light emitting elements, a light receiving element and the like which are viewed from the "E-E" direction in FIG. 1.
Figure 4:
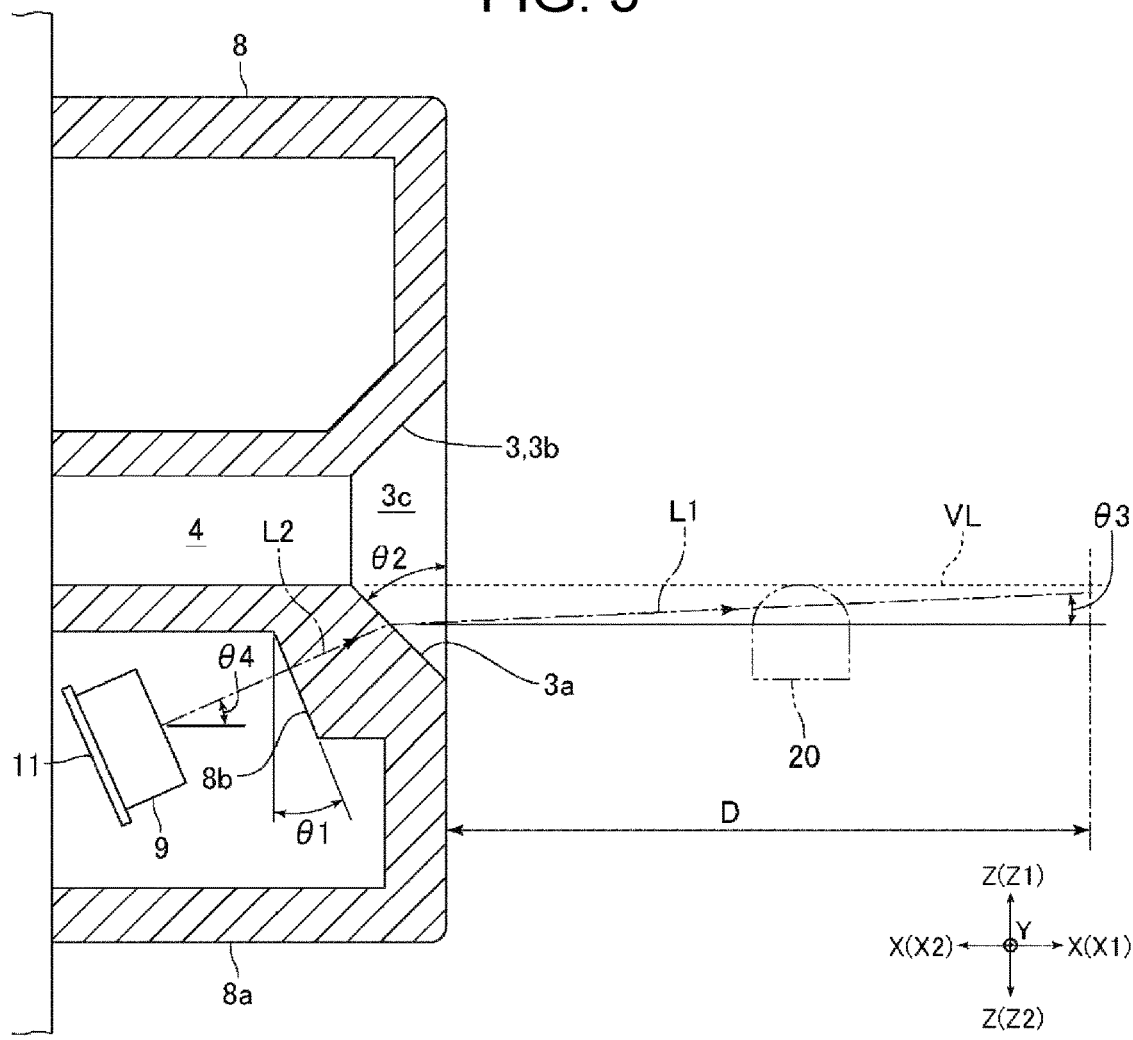
FIG. 4 is an enlarged view showing the "F"-part in FIG. 1.

FIG. 1 is a schematic view showing a card reader 1 in accordance with an embodiment of the present invention. FIG. 2 is a view showing a rear face of a card 2 shown in FIG. 1. FIG. 3 is a view showing a card insertion member 8, light emitting elements 9, a light receiving element 10 and the like which are viewed from the "E-E" direction in FIG. 1. FIG. 4 is an enlarged view showing the "F"-part in FIG. 1.

The card reader 1 in this embodiment is a device structured to perform reading of magnetic data recorded in a card 2 and/or recording of magnetic data to a card 2. The card reader 1 is, for example, mounted on a predetermined host apparatus such as an ATM and is used.

A card 2 is a substantially rectangular card made of vinyl chloride whose thickness is about 0.7-0.8 mm. A rear face of the card 2 is formed with a magnetic stripe 2a in which magnetic data are recorded. The magnetic stripe 2a is formed along a longitudinal direction of the card 2 which is formed in a substantially rectangular shape. The card 2 may be incorporated with an IC chip. Further, the card 2 may be a PET (polyethylene terephthalate) card whose thickness is about 0.18-0.36 mm, or may be a paper card having a predetermined thickness.

The card reader 1 is formed with a card insertion port 3 into which a card 2 is inserted and from which the card 2 is ejected, and a card moving path 4 where the card 2 inserted into the card insertion port 3 is moved. The card reader 1 includes a magnetic head 5 which performs at least one of reading of magnetic data recorded in the card 2 and recording of magnetic data to the card 2, and drive rollers 6 and pad rollers 7 for conveying the card 2 in the card moving path 4. Further, the card reader 1 includes a card insertion member (bezel) 8 formed with the card insertion port 3 and a light emitting element 9 and a light receiving element 10 for detecting a foreign matter which has been attached to the card insertion member 8.

In this embodiment, a card 2 having been inserted into the card insertion port 3 is moved in the "X" direction shown in FIG. 1. In other words, the "X" direction is a moving direction of a card 2 and is an inserting and ejecting direction of the card 2 with respect to the card insertion port 3. In the following descriptions, a moving direction ("X" direction) of a card 2 is referred to as a front and rear direction. Further, a thickness direction ("Z" direction in FIG. 1 and the like) of a card 2 having been inserted into the card insertion port 3 is referred to as an upper and lower direction, and a width direction ("Y" direction in FIG. 1 and the like) of a card 2 perpendicular to the front and rear direction and the upper and lower direction is referred to as a right and left direction.

Further, in the following descriptions, in the front and rear direction, a side in the inserting direction of a card 2 to the card insertion port 3 ("X2" direction side in FIG. 1 and the like) is referred to as a rear side, a side in the ejecting direction of a card 2 from the card insertion port 3 ("X1" direction side in FIG. 1 and the like) is referred to as a front side and, in the upper and lower direction, the "Z1" direction side in FIG. 1 and the like is referred to as an upper side, and the "Z2" direction side in FIG. 1 and the like which is the opposite side is referred to as a lower side. The lower side in this embodiment is a first direction side which is one side in a thickness direction of a card 2, and the upper side is a second direction side which is an opposite side to the first direction side.

The card moving path 4 is connected with a rear end of the card insertion port 3. A card 2 is inserted into the card insertion port 3 and is moved in the card moving path 4 in a state that a rear face of the card 2 faces the lower side and, in addition, in a state that a longitudinal direction of the card 2 matches the front and rear direction. The magnetic head 5 is disposed so as to face the card moving path 4 from a lower side. In other words, the magnetic head 5 is disposed so as to contact with the card 2 from the lower side. Further, the magnetic head 5 is disposed at a position in the right and left direction where the magnetic stripe 2a is passed. The drive roller 6 and the pad roller 7 are disposed so as to face each other in the upper and lower direction. The drive roller 6 is connected with a drive mechanism (not shown) structured to drive the drive roller 6. The pad roller 7 is urged toward the drive roller 6.

(Structure of Card Insertion Member, Light Emitting Element, and Light Receiving Element, and Arrangement of Light Emitting Element and Light Receiving Element)

A light emitting element 9 emits infrared light. The light emitting element 9 in this embodiment is an infrared LED. A light receiving element 10 is capable of receiving infrared light. The light emitting element 9 and the light receiving element 10 are mounted on a common circuit board 11. The circuit board 11 is a rigid circuit board such as a glass epoxy circuit board or a flexible printed circuit board. In this embodiment, two light emitting elements 9 and one light receiving element 10 are mounted on the circuit board 11. The two light emitting elements 9 are disposed so as to interpose the light receiving element 10 therebetween in the right and left direction. The light emitting elements 9, the light receiving element 10 and the circuit board 11 are disposed in an inside of the card insertion member 8. In FIG. 1, the circuit board 11 is not shown.

The card insertion member 8 structures a front end part of the card reader 1. The card insertion member 8 is formed of resin. Specifically, the card insertion member 8 is formed of black resin material which transmits infrared light but blocks visible light. A front face of the card insertion member 8 is formed in a flat face perpendicular to the front and rear direction. The card insertion member 8 is formed with the card insertion port 3 as described above. Further, the card insertion member 8 is formed with a front end part of the card moving path 4 and, as described above, a front end of the card moving path 4 is connected with a rear end of the card insertion port 3. The front end part of the card moving path 4 and the card insertion port 3 penetrate through the card insertion member 8 in the front and rear direction.

A lower face and an upper face of the front end part of the card moving path 4 formed in the card insertion member 8 are formed to be flat faces perpendicular to the upper and lower direction. A shape of a rear end of the card insertion port 3 when viewed in the front and rear direction is a rectangular shape which is long and narrow in the right and left direction. The lower face of the card insertion port 3 is formed to be an inclined face 3a in a flat face shape which is inclined toward the lower side as going to the front side. The upper face of the card insertion port 3 is formed to be an inclined face 3b in a flat face shape which is inclined toward the upper side as going to the front side. Further, both faces on the right and left sides of the card insertion port 3 are formed to be inclined faces 3c in a flat face shape which are inclined toward an outer side in the right and left direction as going to the front side.

A lower side part 8a of the card insertion member 8 which is a portion on a lower side with respect to the card moving path 4 is formed in a hollow shape whose rear end side is opened. The light emitting elements 9, the light receiving element 10 and the circuit board 11 are disposed in an inside of the lower side part 8a. In other words, the light emitting elements 9, the light receiving element 10 and the circuit board 11 are disposed on a lower side with respect to the card moving path 4. The light emitting elements 9 and the light receiving element 10 are disposed at substantially the same position as the magnetic head 5 in the right and left direction when viewed in the front and rear direction. Further, the magnetic head 5 in this embodiment is a two channel-type magnetic head having two head cores adjacent to each other in the right and left direction, and the light receiving element 10 is disposed at the same position as one channel of the magnetic head 5 in the right and left direction when viewed in the front and rear direction. In other words, the light receiving element 10 is disposed at the same position as the magnetic head 5 in the right and left direction when viewed in the front and rear direction.

The light emitting element 9 emits light toward an obliquely upper front side. A light receiving face of the light receiving element 10 faces an obliquely upper front side. In this embodiment, when viewed in the right and left direction, an optical axis of the light emitting element 9 is substantially coincided with an optical axis of the light receiving element 10. As shown in FIG. 4, an inner side face of the lower side part 8a formed in a hollow shape is formed with an incidence surface 8b on which light emitted from the light emitting element 9 is incident. The incidence surface 8b is formed to be a flat face perpendicular to the optical axis of the light which is emitted from the light emitting element 9 and is incident on the incidence surface 8b. Further, the incidence surface 8b is disposed on an obliquely lower rear side with respect to the inclined face 3a. An inclination angle θ1 of the incidence surface 8b with respect to the upper and lower direction is set to be smaller than an inclination angle θ2 of the inclined face 3a with respect to the upper and lower direction.

In this embodiment, as shown in FIG. 4, the light emitted from the light emitting element 9 and transmitted through the incidence surface 8b is incident on the inclined face 3a. Specifically, the light emitted from the light emitting element 9 is incident on the incidence surface 8b and is transmitted through the incidence surface 8b and, after passing a portion of the card insertion member 8 between the incidence surface 8b and the inclined face 3a, the light is incident on the inclined face 3a from the rear side and the lower side. In other words, the light emitted from the light emitting element 9 is incident on the inclined face 3a from the rear side and the lower side after passing a part of the card insertion member 8.

Further, the light transmitted through the incidence surface 8b and incident on the inclined face 3a is refracted at the inclined face 3a and is emitted from the inclined face 3a toward the front side. The light emitting element 9 in this embodiment emits, for example, infrared light having strong directivity. Therefore, the light emitted from the inclined face 3a linearly advances toward the front side. In this case, the light emitted from the inclined face 3a may be, for example, expanded to both sides in the upper and lower direction and both sides in the right and left direction.

As shown in FIG. 4, when viewed in the right and left direction, an optical axis "L1" of the light emitted from the inclined face 3a is inclined toward an upper side as going to the front side. Further, when viewed in the right and left direction, an inclination angle θ3 with respect to the front and rear direction of the optical axis "L1" of the light emitted from the inclined face 3a is set to be smaller than an inclination angle θ4 of an optical axis "L2" of the light incident on the inclined face 3a with respect to the front and rear direction. The inclination angle θ3 is, for example, about 2°.

Light emitted from the light emitting element 9 and reflected on a front side and an upper side of the inclined face 3a and light emitted from the light emitting element 9 and reflected on a front side of the card insertion member 8 are incident on the light receiving element 10. Specifically, the light emitted from the inclined face 3a and reflected on the front side and the upper side of the inclined face 3a and the light emitted from the inclined face 3a and reflected on the front side of the card insertion member 8 are incident on the light receiving element 10.

In this embodiment, in a case that a skimming magnetic head 20 is tried to be attached to a front side of the card insertion member 8, it is assumed that the skimming magnetic head 20 is disposed on a lower side with respect to the card moving path 4 and in a range of a predetermined distance "D" from a front end of the card insertion port 3 toward the front side (see FIG. 4). According to examination of the present inventors, it is assumed that the skimming magnetic head 20 is disposed on a lower side with respect to the card moving path 4 and in a range of 10 (cm) from the front end of the card insertion port 3 toward the front side. Therefore, in this embodiment, the optical axis "L1" of the light emitted from the inclined face 3a is, when viewed in the right and left direction, set to be a lower side with respect to a virtual line "VL" in a straight line shape, which is extended to the front side from the lower face of the card moving path 4, in a range of at least 10 (cm) from the front end of the card insertion port 3 toward the front side.

Principal Effects in this Embodiment

As described above, in this embodiment, the light emitted from the light emitting element 9 is incident on the inclined face 3a of the card insertion port 3 from a rear side and a lower side and is refracted at the inclined face 3a and emitted from the inclined face 3a toward a front side. Further, in this embodiment, the light emitted from the light emitting element 9 and reflected on a front side and an upper side of the inclined face 3a, and the light emitted from the light emitting element 9 and reflected on a front side of the card insertion member 8 are incident on the light receiving element 10.

Therefore, in this embodiment, in both cases, that is, in a case that a skimming magnetic head 20 is attached on a front side of the card insertion member 8 and, in a case that a skimming magnetic head 20 is attached to the inclined face 3a of the card insertion port 3, the skimming magnetic head 20 can be detected by using the common light emitting element 9 and the common light receiving element 10. Accordingly, in this embodiment, the skimming magnetic head 20 attached on a front side of the card insertion member 8 and the skimming magnetic head 20 attached to the inclined face 3a of the card insertion port 3 can be detected with a simple structure.

In this embodiment, when viewed in the right and left direction, the optical axis "L1" of the light emitted from the inclined face 3a is inclined toward an upper side as going to the front side, and the inclination angle θ3 with respect to the front and rear direction of the optical axis "L1" is set to be smaller than the inclination angle θ4 with respect to the front and rear direction of the optical axis "L2" of the light incident on the inclined face 3a. Therefore, according to this embodiment, an irradiation range in the front and rear direction of the light emitted from the inclined face 3a is easily widened. Accordingly, in this embodiment, a detection region in the front and rear direction for a skimming magnetic head 20 attached on a front side of the card insertion member 8 can be widened and, as a result, the skimming magnetic head 20 attached on a front side of the card insertion member 8 is easily detected.

Especially, in this embodiment, when viewed in the right and left direction, the optical axis "L1" of the light emitted from the inclined face 3a is located on a lower side with respect to the virtual line "VL" in a range of at least 10cm from the front end of the card insertion port 3 toward the front side and thus, the light emitted from the inclined face 3a can be irradiated to an assumed attaching range of the skimming magnetic head 20 which is attached on a front side of the card insertion member 8. Therefore, according to this embodiment, the skimming magnetic head 20 attached on a front side of the card insertion member 8 is further easily detected.

In this embodiment, the card insertion member 8 transmits infrared light but blocks visible light. Therefore, according to this embodiment, visible light can be prevented from being incident on the light receiving element 10 from the outside of the card insertion member 8 and, as a result, erroneous detection of the light receiving element 10 can be prevented. Accordingly, in this embodiment, the skimming magnetic head 20 attached on a front side of the card insertion member 8 and the skimming magnetic head 20 attached to the inclined face 3a of the card insertion port 3 can be detected with a high degree of accuracy.

Further, the skimming magnetic head 20 is commonly disposed at the same position as the magnetic head 5 in the right and left direction. In this embodiment, when viewed in the front and rear direction, the light receiving element 10 is disposed at the same position as the magnetic head 5 in the right and left direction and thus, the skimming magnetic head 20 attached on a front side of the card insertion member 8 and the skimming magnetic head 20 attached to the inclined face 3a of the card insertion port 3 are easily detected.

Other Embodiments

Although the present invention has been shown and described with reference to a specific embodiment, various changes and modifications will be apparent to those skilled in the art from the teachings herein.

In the embodiment described above, as shown in FIG. 5, an inner side face of a lower side part 8a which is formed in a hollow shape may be formed with an incidence surface 8c on which light emitted from a light emitting element 9 is incident and a reflection surface 8d which reflects the light toward the inclined face 3a. In this case, the light emitted from the light emitting element 9 and transmitted through the incidence surface 8c is reflected by the reflection surface 8d and then incident on the inclined face 3a. In comparison with the modified embodiment shown in FIG. 5, in the embodiment described above, a shape of the card insertion member 8 can be simplified.

Figure 5:
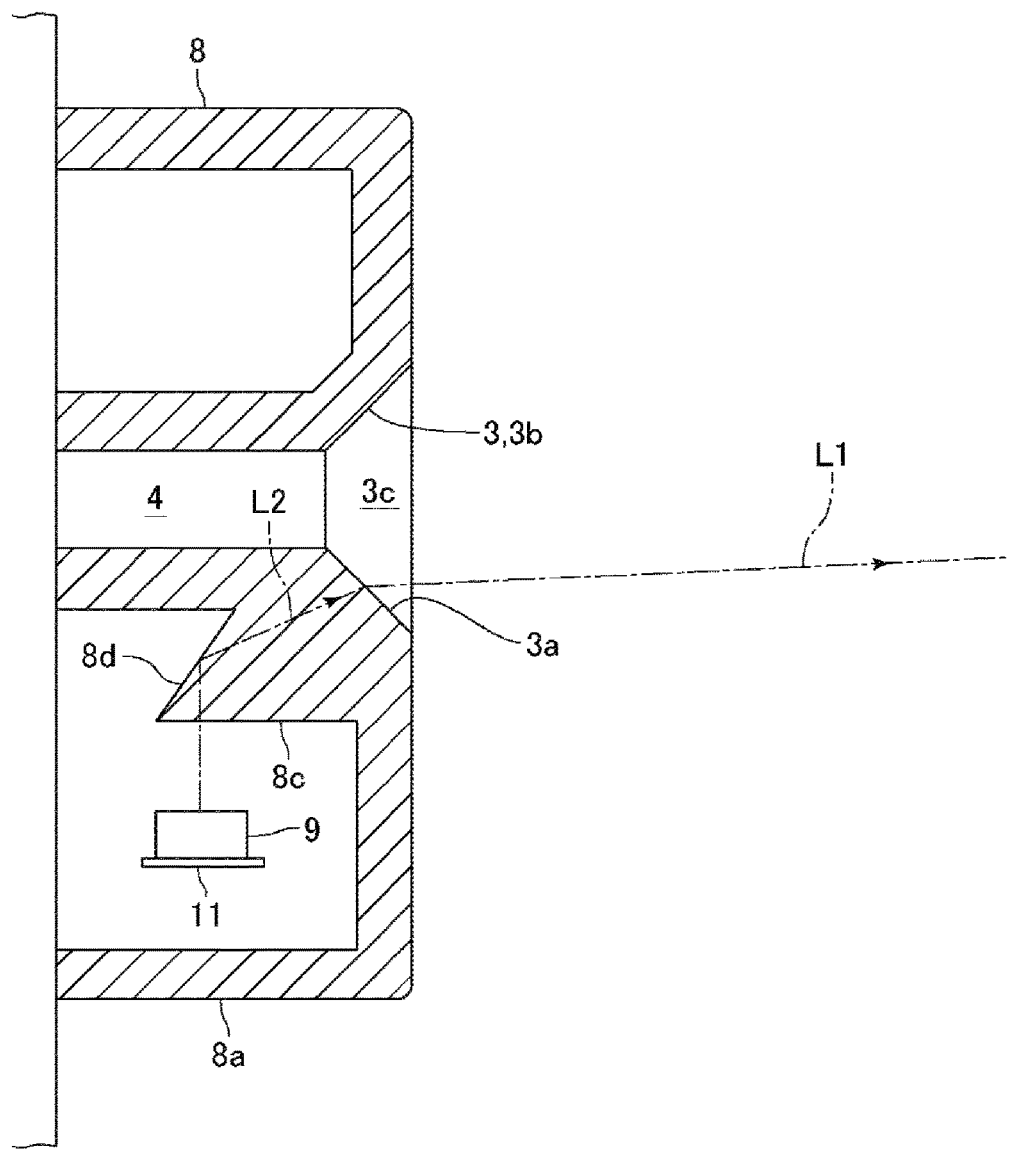
FIG. 5 is a view for explaining a structure of a card insertion member and an arrangement of a light emitting element in accordance with another embodiment of the present invention.

In the modified embodiment shown in FIG. 5, for example, the light emitting element 9 emits light toward directly above and a light receiving face of a light receiving element 10 faces directly above. Further, the incidence surface 8c is, for example, a flat face perpendicular to the upper and lower direction and is perpendicular to the optical axis of the light which is emitted from the light emitting element 9 and incident on the incidence surface 8c. Further, an angle of the reflection surface 8d is set to be an angle so that the light incident on the reflection surface 8d is totally reflected. In FIG. 5, the same reference signs are used in the structures similar to the embodiment described above.

In the embodiment described above, instead of the magnetic stripe 2a formed on a rear face of a card 2, alternatively, in addition to the magnetic stripe 2a, a magnetic stripe may be formed on a front face of a card 2. In this case, the card reader 1 includes a magnetic head structured to contact with a card 2 from an upper side instead of the magnetic head 5, alternatively, in addition to the magnetic head 5. Further, in this case, an upper side part of the card insertion member 8 which is an upper side portion with respect to the card moving path 4 is formed in a hollow shape, and the light emitting element 9, the light receiving element 10 and the circuit board 11 are disposed in an inside of the upper side part.

Further, in this case, for example, an inner side face of the upper side part formed in a hollow shape is formed with an incidence surface on which light emitted from the light emitting element 9 is incident, and the light emitted from the light emitting element 9 and transmitted through the incidence surface is incident on the inclined face 3b from a rear side and an upper side. Further, the light incident on the inclined face 3b is refracted at the inclined face 3b and is emitted from the inclined face 3b toward the front side. When viewed in the right and left direction, an optical axis of the light emitted from the inclined face 3b is inclined toward a lower side as going to the front side. The light receiving element 10 is made incident with the light emitted from the light emitting element 9 and reflected on a front side and a lower side of the inclined face 3b and the light emitted from the light emitting element 9 and reflected on a front side of the card insertion member 8.

In a case that a magnetic stripe is formed on a front face of a card 2 instead of the magnetic stripe 2a, the light emitting element 9, the light receiving element 10 and the circuit board 11 are not disposed in an inside of the lower side part 8a. Further, in a case that a magnetic stripe is formed on a front face of a card 2 instead of the magnetic stripe 2a, an upper side ("Z1" direction side) is the first direction side, and a lower side ("Z2" direction side) is the second direction side.

In the embodiment described above, the optical axis "L1" of the light emitted from the inclined face 3a may be parallel to the front and rear direction, or may be inclined toward the lower side as going to the front side. Further, in the embodiment described above, the optical axis "L1" of the light emitted from the inclined face 3a may be disposed on an upper side with respect to the virtual line "VL" in a range of 10 (cm) from the front end of the card insertion port 3 toward the front side. In addition, in the embodiment described above, the inclined face 3a may be formed in a protruding curved face shape. Further, in the embodiment described above, the light emitting element 9, the light receiving element 10 and the circuit board 11 may be disposed on an outer side of the card insertion member 8. Specifically, the light emitting element 9, the light receiving element 10 and the circuit board 11 may be disposed on a rear side with respect to the rear end of the card insertion member 8.

In the embodiment described above, only one light emitting element 9 may be mounted on the circuit board 11. However, in a case that two light emitting elements 9 are mounted on the circuit board 11, an irradiation range of light of the light emitting element 9 can be widened and thus, a detection region for the skimming magnetic head 20 can be widened. Further, in the embodiment described above, the card reader 1 is a card conveyance type card reader having the drive roller 6 and the pad roller 7. However, the card reader 1 may be a manual type card reader in which an operation is manually performed by a user.

REFERENCE SIGNS LIST 1 card reader
2 card
3 card insertion port
3a inclined face
4 card moving path
5 magnetic head
8 card insertion member
8b, 8c incidence surface
8d reflection surface
9 light emitting element
10 light receiving element
"L1" optical axis of light emitted from inclined face
"L2" optical axis of light incident on inclined face
"VL" virtual line
"X" front and rear direction (inserting and ejecting direction of card)
"X1" front side (side in ejecting direction of card)
"X2" rear side (side in inserting direction of card)
"Y" width direction of card
"Z" thickness direction of card
"Z1" second direction side
"Z2" first direction side θ3 inclination angle of optical axis of light emitted from inclined face θ4 inclination angle of optical axis of light incident on inclined face

What is claimed is:

1. A card reader comprising:
a magnetic head which performs at least one of reading of magnetic data recorded in a card and recording of magnetic data to the card;
a card insertion member which is formed with a card insertion port into which the card is inserted; and
a light emitting element and a light receiving element structured to detect that a foreign matter has been attached to the card insertion member;
wherein when a side in an inserting direction of the card to the card insertion port is defined as a rear side, a side in an ejecting direction of the card from the card insertion port is defined as a front side, one side in a thickness direction of the card inserted into the card insertion port is defined as a first direction side, an opposite side to the first direction side is defined as a second direction side, and an inserting and ejecting direction of the card into and from the card insertion port is defined as a front and rear direction,
the magnetic head is disposed so as to contact with the card from the first direction side;
a face on the first direction side of the card insertion port is formed to be an inclined face in a protruding curved face shape or in a flat face shape which is inclined toward the first direction side as going to the front side;
light emitted from the light emitting element is passed through a part of the card insertion member and then, the light is incident on the inclined face from the rear side and the first direction side and is refracted at the inclined face and is emitted from the inclined face toward at least the front side; and
light emitted from the light emitting element and reflected on the front side and the second direction side of the inclined face, and light emitted from the light emitting element and reflected on the front side of the card insertion member are incident on the light receiving element,
wherein in a case that a direction perpendicular to the front and rear direction and the thickness direction of the card is defined as a width direction of the card,
when viewed in the width direction of the card, an optical axis of light emitted from the inclined face is inclined toward the second direction side as going to the front side, and
an inclination angle of an optical axis of the light emitted from the inclined face with respect to the front and rear direction is smaller than an inclination angle with respect to the front and rear direction of an optical axis of light which is incident on the inclined face,
the card reader further comprising a card moving path which is connected with a rear end of the card insertion port and in which the card inserted into the card insertion port is moved,
wherein when viewed in the width direction of the card, the optical axis of the light emitted from the inclined face is located on the first direction side with respect to a virtual line in a straight line shape which is extended to the front side from a face on the first direction side of the card moving path in a range of at least 10 cm from a front end of the card insertion port toward the front side.

2. The card reader according to claim 1, wherein the light emitting element and the light receiving element are disposed on the first direction side with respect to the card moving path.

3. The card reader according to claim 1, wherein the inclined face is formed in a flat face shape.

4. The card reader according to claim 1, wherein the light emitting element emits infrared light, and the card insertion member transmits the infrared light and blocks visible light.

5. The card reader according to claim 1, wherein when viewed in the front and rear direction, the light receiving element is disposed at a same position as the magnetic head in the width direction of the card.

6. The card reader according to claim 1, wherein
the card insertion member is formed with an incidence surface on which the light emitted from the light emitting element is incident, and
the light emitted from the light emitting element and transmitted through the incidence surface is incident on the inclined face.

7. The card reader according to claim 1, wherein
the card insertion member is formed with an incidence surface on which the light emitted from the light emitting element is incident and a reflection surface reflecting the light toward the inclined face, and
the light emitted from the light emitting element and transmitted through the incidence surface is reflected by the reflection surface and then is incident on the inclined face.

8. A card reader comprising:
a magnetic head which performs at least one of reading of magnetic data recorded in a card and recording of magnetic data to the card;
a card insertion member which is formed with a card insertion port into which the card is inserted; and
a light emitting element and a light receiving element structured to detect that a foreign matter has been attached to the card insertion member;
wherein when a side in an inserting direction of the card to the card insertion port is defined as a rear side, a side in an ejecting direction of the card from the card insertion port is defined as a front side, one side in a thickness direction of the card inserted into the card insertion port is defined as a first direction side, an opposite side to the first direction side is defined as a second direction side, and an inserting and ejecting direction of the card into and from the card insertion port is defined as a front and rear direction,
the magnetic head is disposed so as to contact with the card from the first direction side;
a face on the first direction side of the card insertion port is formed to be an inclined face in a protruding curved face shape or in a flat face shape which is inclined toward the first direction side as going to the front side;
light emitted from the light emitting element is passed through a part of the card insertion member and then, the light is incident on the inclined face from the rear side and the first direction side and is refracted at the inclined face and is emitted from the inclined face toward at least the front side; and
light emitted from the light emitting element and reflected on the front side and the second direction side of the inclined face, and light emitted from the light emitting element and reflected on the front side of the card insertion member are incident on the light receiving element, wherein in a case that a direction perpendicular to the front and rear direction and the thickness direction of the card is defined as a width direction of the card, when viewed in the width direction of the card, an optical axis of light emitted from the inclined face is inclined toward the second direction side as going to the front side, and an inclination angle of an optical axis of the light emitted from the inclined face with respect to the front and rear direction is smaller than an inclination angle with respect to the front and rear direction of an optical axis of light which is incident on the inclined face, wherein the light emitting element and the light receiving element are disposed on the first direction side with respect to the card moving path.

9. A card reader comprising:

a magnetic head which performs at least one of reading of magnetic data recorded in a card and recording of magnetic data to the card;

a card insertion member which is formed with a card insertion port into which the card is inserted; and a light emitting element and a light receiving element structured to detect that a foreign matter has been attached to the card insertion member;

wherein when a side in an inserting direction of the card to the card insertion port is defined as a rear side, a side in an ejecting direction of the card from the card insertion port is defined as a front side, one side in a thickness direction of the card inserted into the card insertion port is defined as a first direction side, an opposite side to the first direction side is defined as a second direction side, and an inserting and ejecting direction of the card into and from the card insertion port is defined as a front and rear direction, the magnetic head is disposed so as to contact with the card from the first direction side;

a face on the first direction side of the card insertion port is formed to be an inclined face in a protruding curved face shape or in a flat face shape which is inclined toward the first direction side as going to the front side;

light emitted from the light emitting element is passed through a part of the card insertion member and then, the light is incident on the inclined face from the rear side and the first direction side and is refracted at the inclined face and is emitted from the inclined face toward at least the front side; and light emitted from the light emitting element and reflected on the front side and the second direction side of the inclined face, and light emitted from the light emitting element and reflected on the front side of the card insertion member are incident on the light receiving element, wherein in a case that a direction perpendicular to the front and rear direction and the thickness direction of the card is defined as a width direction of the card, when viewed in the width direction of the card, an optical axis of light emitted from the inclined face is inclined toward the second direction side as going to the front side, and an inclination angle of an optical axis of the light emitted from the inclined face with respect to the front and rear direction is smaller than an inclination angle with respect to the front and rear direction of an optical axis of light which is incident on the inclined face, wherein the card insertion member is formed with an incidence surface on which the light emitted from the light emitting element is incident, and the light emitted from the light emitting element and transmitted through the incidence surface is incident on the inclined face.

* * * * *